July 10, 1956
E. LATTA
2,753,721
DIRECTION-SENSITIVE LINKAGE-LENGTHENING
ARRANGEMENT, PARTICULARLY FOR USE IN
DEPRESSED PARKING OF
WINDSHIELD WIPERS
Filed Oct. 5, 1953
3 Sheets-Sheet 1
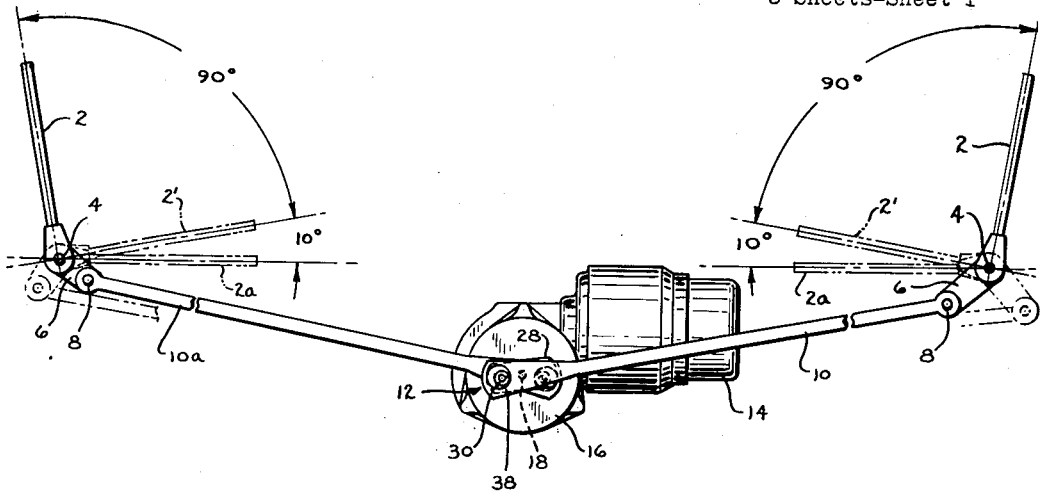
FIG.1
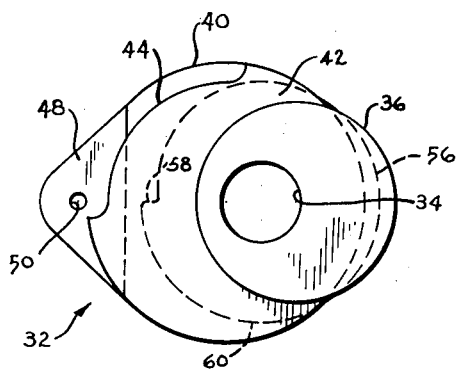
FIG.5
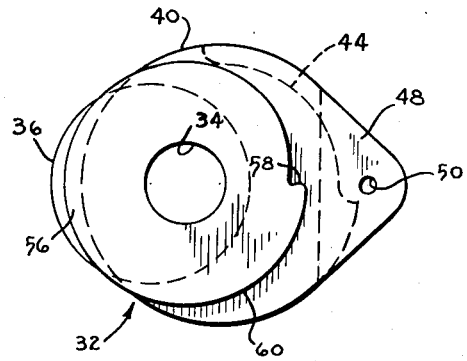
FIG.6
FIG.6A
INVENTOR.
EDWARD LATTA
BY
James and Franklin
ATTORNEY INVENTOR.
EDWARD LATTA
BY James and Franklin
ATTORNEY

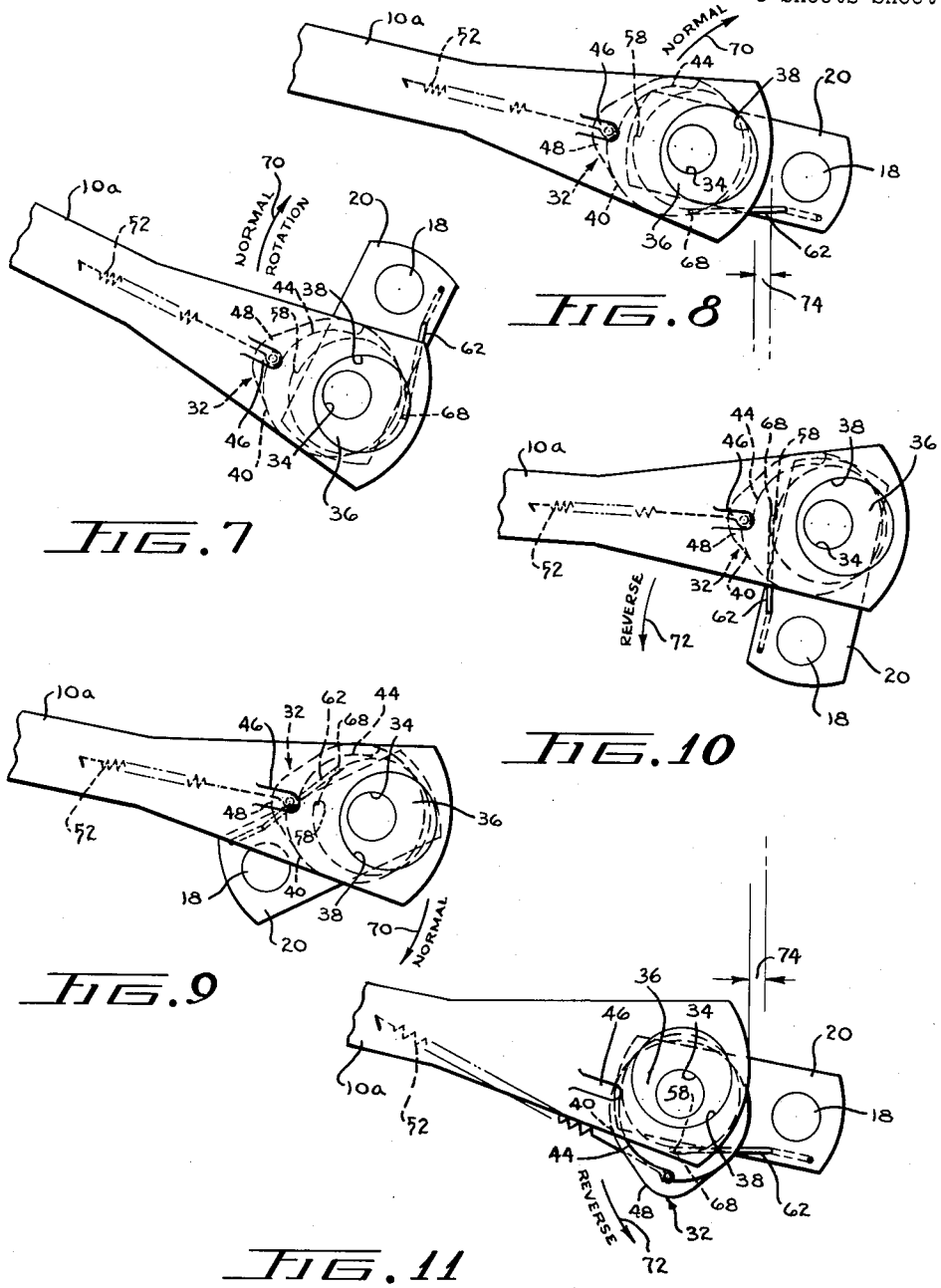

United States Patent Office 2,753,721
Patented July 10, 1956

2,753,721

DIRECTION-SENSITIVE LINKAGE-LENGTHENING ARRANGEMENT, PARTICULARLY FOR USE IN DEPRESSED PARKING OF WINDSHIELD WIPERS

Edward Latta, Owosso, Mich., assignor to Redmond Company, Inc., Owosso, Mich., a corporation of Michigan Application October 5, 1953, Serial No. 383,961

20 Claims. (Cl. 74—75)

The present invention relates to a linkage-lengthening arrangement for use in a linkage adapted to be selectively driven in opposite directions, the length of one portion of the linkage varying in an automatic manner depending upon the direction in which the linkage is driven. The invention is particularly adapted for use in conjunction with electric-motor driven windshield wiper systems.

When windshield wiper blades are oscillated over the windshield in order to wipe rain or the like therefrom, it is of the essence of their function that they be oscillated over that area of the windshield through which the driver and passengers look. However, when the windshield wiper is not in use it is desired that the blades be parked or stopped in such a position as not to interfere with the vision of the driver and passengers, and preferably substantially flush against the edge of the windshield and beyond their normal range of oscillation. With pneumatically operated windshield wipers the attainment of this result is not difficult. However, with electric motor driven windshield wipers serious difficulties arise to prevent the attainment of this objective. One approach is to provide mechanism by means of which rotation of the motor in one direction will cause the windshield wiper blades to oscillate and clean the windshield and rotation of the motor in the opposite direction will bring into action a cam-controlled switch or the like which will shut off the motor and thus cause the blades to stop when the blades are at the lowest point in their cycle of operation. However, this alone does not produce depressed parking, with the blades at positions below their normal arcs of travel.

It has been proposed to achieve depressed parking by providing in the wiper-actuating linkage a direction-sensitive arrangement which will automatically vary the effective length of one of the linkage members depending upon the direction in which the linkage is driven, the linkage member usually normally having its shorter length during normal operation of the wiper and its longer length when the wiper is driven in the opposite direction to its parked position. The devices of the prior art which attempted to accomplish this purpose are either extremely complex or else non-positive in operation. In some cases friction is exclusively relied upon to actuate the linkage-lengthening arrangement. This has not only proved to be unreliable, but also renders the mechanism extremely susceptible to wear, an exceedingly important factor when it is considered that windshield wiper mechanisms should be capable of operating for the life of the automobile in which they are installed without requiring adjustment or repair if they are to be competitive with pneumatically operated windshield wipers.

I have devised a structure in which the linkage-lengthening arrangement is much more certain of operation than are comparable prior art devices, and in which the operative element of the linkage-lengthening arrangement is moved from its position corresponding to normal operation to its position corresponding to parking of the blades in a positive manner and without having to rely upon friction. Said operative element is also positively biased toward its normal position, thus ensuring proper operation of the windshield wiper during normal operation even if the linkage-lengthening arrangement should become slightly damaged or misaligned. Because of the positive mode of actuation of the linkage-lengthening arrangement the tolerance of the arrangement to wear, looseness of fit, variations in dimensions due to manufacturing necessities, and the like is greatly improved when compared with prior art devices. The above objectives are achieved through the use of an assembly formed of simple, inexpensive and readily fabricated parts.

According to the present invention the linkage between the driving motor and the windshield wiper blade includes a pair of pivotally connected members, such as a crank arm or its equivalent and another member connected thereto. The pivotal connection between the said members includes an element rotatable with respect to both and having its axes of rotation with respect to each non-concentric. Hence as the element rotates relative to one of the members it will change the relative positions of the members and thus vary the effective length of one of the members relative to the other. A spring or other resilient means is active between the element and one of the linkage members in order to urge the element to the position which it is to assume in one condition of operation, preferably normal operation. The element is provided with a directional abutment, here shown as part of a cam surface over which a finger connected to one of the linkage members rides, the finger moving toward the abutment in opposite directions depending upon the direction in which the linkage is driven. The abutment is effective for one direction of movement of the finger relative thereto but not for the other direction. When the finger moves over the cam surface in one direction, it will engage the abutment and will then positively rotate the element, thus changing the effective length of one of the linkage members. When the linkage is driven in the opposite direction, the finger will snap ineffectively over the abutment, the element then remaining in its spring-urged, and preferably normal position. In this way the fit of the element with respect to the linkage members which it connects is not critical, no adjustment thereof is required or provided, nor is the precise degree of force or contact between the finger and the cam surface critical. Indeed, if the abutment projects out from the connecting element the finger could be entirely free of the element except when the abutment is approached, and the device would still function in a reliable and effective manner.

To the accomplishment of the above, and to such other objects as may hereinafter appear, the present invention relates to a direction-sensitive linkage-lengthening arrangement, and to the windshield wiper operating system in which it is used, as defined in the appended claims and as described in this specification, taken together with the accompanying drawings in which:

Fig. 1 is an idealized view of a windshield wiper system incorporating the present invention;

Fig. 5 is a top plan view of the connecting element in the linkage lengthening arrangement;

Fig. 6 is a bottom plan view thereof;

Fig. 6A is a view similar to Fig. 6 but showing an alternative construction for the connecting element;

Figs. 7, 8, and 9 are schematic representations showing the positions which various of the parts assume at different stages of movement of the linkage in a normal direction; and Figs. 10 and 11 are similar schematic representations of the positions which the parts assume when the linkage is driven in reverse direction for parking purposes.

Figure 3:
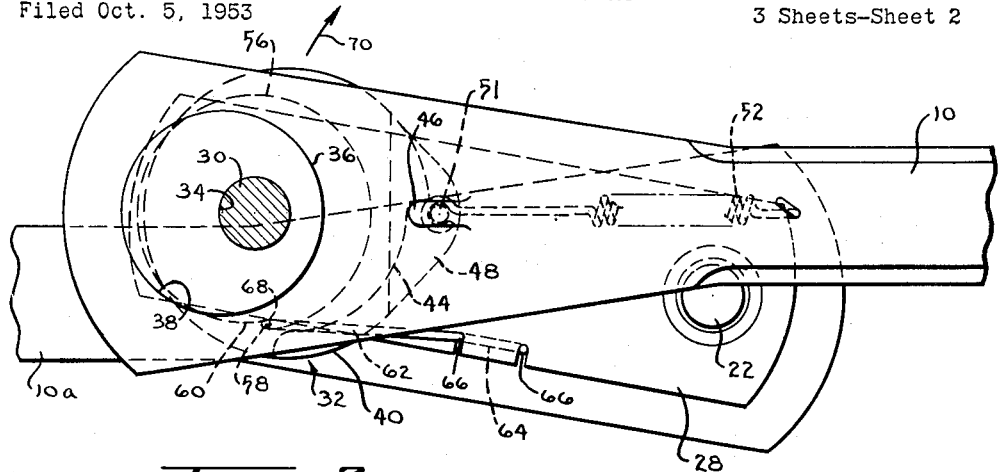
Fig. 3 is a top plan view taken along the line 3—3 of Fig. 2.
Figure 4:
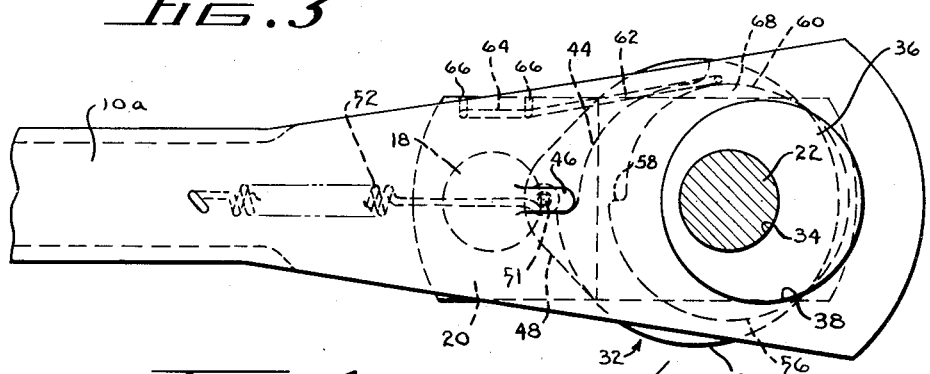
Fig. 4 is a top plan view taken along the line 4—4 of Fig. 2.
Figure 2:
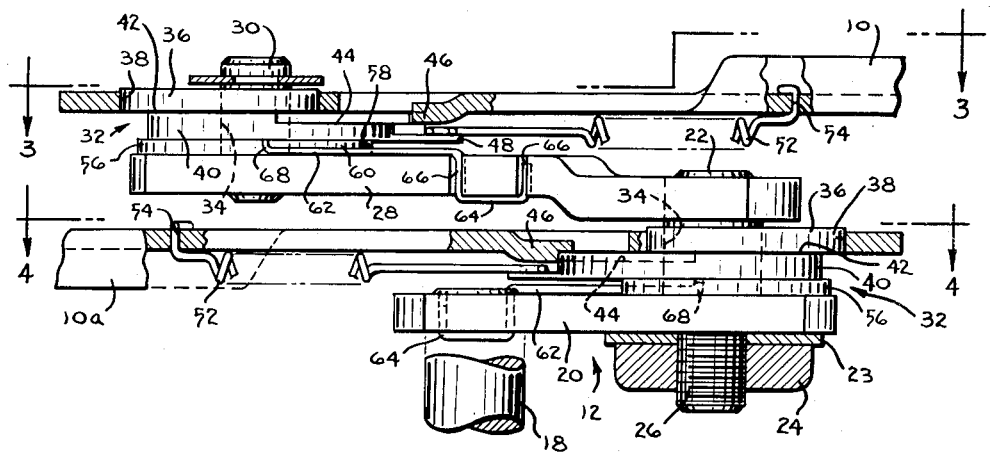
Fig. 2 is a side elevational view, partially broken away and cross-sectioned, of the crank assembly portion of the windshield wiper actuating linkage.

As is customary, a pair of windshield wiper blades 2 are pivotally mounted at 4 so as to be oscillatable over the windshield which they are to clean, the blades 2 being operatively connected to arms 6 pivotally connected at 8 to connecting links 10 and 10a which are in turn pivotally connected, in a manner subsequently to be described in detail, to a double crank assembly generally designated 12 driven by a motor 14 through a gear train in a housing 16, the latter containing various control instrumentalities, and in particular a known type of position-and-direction-sensitive switch effective, when the motor 14 is being rotated in a reverse direction for parking of the blades 2, to stop the motor 14 when the blades are in their lowermost position, as indicated by the reference numeral 2a in Fig. 1. Under normal circumstances the blades 2 are oscillated through an arc between the positions 2 and 2', that arc being here shown as approximately 90 degrees. When the blades are to be parked they are caused to oscillate to the position 2a, angularly depressed beyond the position 2' by a distance which is here illustrated as approximately 10 degrees. In order to accomplish this result the effective length of the connecting links 10 and 10a with respect to the crank arms of the double crank assembly 12 to which they are respectively connected must be increased. Reference to Figs. 2–6 will disclose the manner in which the connecting links 10 and 10a are connected to the double crank assembly 12 in order to accomplish that end.

The crank assembly 12 comprises a crank shaft 18 rotated by the motor 14 and to which crank arm 20 is secured. A pin 22 extends up from the crank arm 20 at a point displaced from the axis of the shaft 18, is made fast to the crank arm 20 by means of lock washer 23 and nut 24 received on the threaded tip 26 of the pin 22, and supports at its upper end a second crank arm 28, the latter being fast on the pin 22 and extending out to the other side of the crank shaft 18 from the pin 22, there carrying a pin 30 which extends up therefrom.

Resting on the upper surfaces of the crank arms 20 and 28 are connecting elements generally designated 32 and best shown in Figs. 5 and 6. These connecting elements are vertically apertured at 34, the pins 22 and 30 respectively passing therethrough and the elements 32 being freely rotatable thereabout. The upper portion 36 of the elements 32 is generally circular in outline, eccentric with respect to the aperture 34, and adapted to be loosely received within an aperture 38 in the ends of the connecting links 10a and 10 respectively. Immediately below the element portion 36 is a portion 40 of greater diameter, upon the upper surface 42 of which the connecting links 10a and 10 rest. A peripheral portion of this upper surface 42 is cut away at 44 to define an arcuate cut out area of limited extent, here shown as extending approximately 90 degrees. Portions of the connecting links 10a and 10 are struck downwardly to define fingers 46 which are received within the cutout areas 44 and, in cooperation with the cutout areas 44, define interengaging means which limit rotational movement of the elements 32 with respect to the connecting links 10 and 10a respectively. The element portion 40 is also provided with a projecting nose 48 provided with an aperture 50 through which a pin or the like 51 is received to fasten one end of spring 52, the other end of the spring being secured to the corresponding connecting link 10a or 10 as by being passed through the aperture 54 therein. The spring 52 is of the tension type, and acts to bias the connecting elements 32 with respect to the links 10a and 10 to their normal positions as shown in Figs. 2–4 and 7–10.

The lowest portion 56 of the connecting element 32 rests on the upper surface of the crank arms 20 and 28 respectively, and the side surface of the element portion 56, which acts as a cam surface, is substantially concentric with the pins 22 and 30 respectively, and has an irregularity defined by the abrupt inset wall 58 and the smoothly outwardly curved wall 60 which merges with the substantially circular cam surface 56, thus defining a structure effective as an abutment when motion relative thereto in a counter-clockwise direction in Figs. 7–12 is involved. A spring finger 62 is mounted on each of the crank arms 20 and 28 in any appropriate manner, as by having its reversely bent end 64 received within slots 66 open at the sides of the crank arms 20 and 28, the other ends 68 of the fingers 62 engaging and sliding over the cam surfaces 56 of the elements 32.

The mode of operation of this system can best be appreciated from examination of Figs. 7–12. When the motor 14 drives the crank assembly 12 in the direction of normal rotation, as indicated by the clockwise arrows 70, the crank arms 20 and 28 are caused to rotate about the crank shaft 18. For purposes of simplification of illustration, only the crank arm 20 and its associated connecting link 10a is shown in Figs. 7–11, and it will be understood that the connection between the crank arm 28 and the connecting link 10 will function in a corresponding manner. As the crank arm 20 rotates in the direction of the screws 70 the end 68 of the spring 62 will slide along the cam surface 56 in a clockwise direction relative thereto, as shown, approaching the discontinuity 58, 60 from the high side thereof and thus ineffectually snapping over the abruptly inset wall 58 and sliding along the smoothly outwardly curved wall 60. (Compare Figs. 7, 8 and 9, which represent relative positions of parts progressively assumed during operation in a normal direction.) Whatever frictional effect may be exerted by the spring tip 68 on the cam surface 56 tending to cause the element 24 to be dragged along therewith will be effectively nullified by the action of the spring 52, which biases the element 32 to its normal position, and will also preferably be positively prevented by engagement between the finger 46 on the connecting link 10 and one end of the arcuately cutout area 44. With the element 32 in this normal position, the distance between the axis of the crank shaft 18 and the central axis of the upper element portion 36 which rotates within the aperture 38 in the connecting link 10a will remain fixed, the connecting link 10a will be moved over a predetermined distance by the crank arm 20, and the windshield wiper blades 2 will be caused to oscillate between the positions 2 and 2' as shown in Fig. 1. When the crank arm 20 and connecting link 10a are substantially in line, as shown in Fig. 8, the wiper blade will be in its position 2'.

When the direction of rotation of the motor 14 is reversed, as indicated by the arrows 72, the direction of movement of the tip 68 of the spring 62 over the cam surface 56 will also be reversed to a counter-clockwise direction. Consequently the spring tip 68 will approach the abruptly inset wall 58 along the smoothly curved wall 60, it will engage against the wall 58, the latter thus defining a positive abutment (see Fig. 10) and continued rotation of the crank arm 20 in the reverse direction will positively cause the element 32 to rotate with respect to the crank arm 20, against the action of and extending the spring 52. This rotation will continue for as long as permitted. As here shown, engagement between the finger 46 and the other end of the arcuately cut area 44 will positively limit that rotation to approximately 90 degrees. (See Fig. 11.) At this point in the cycle, preferably substantially corresponding to the in-line position of the crank arm 20 and connecting link 10a, rotation of the motor 14 will be stopped, as through a suitable direction-and-position-sensitive switch mounted in the casing 16. When the element 32 assumes the position to which it is thus positively urged, the portion 36 thereof will have been caused to rotate relative to the connecting link 10a to a corresponding degree, and that rotation will take place with respect to the axis of the pin 22, with respect to which the element portion 36 is eccentric. As a result the effective length of the connecting link 10a relative to the central axis of the element portion 36 is increased, and the wiper blade 2 to which it is connected is caused to assume its depressed position 2a, as is desired. A comparison of Fig. 8, in which the element 32 is in its normal position, with Fig. 11, in which the element 32 is in its parking position, the crank arm 20 being in the same rotative position in both figures, shows that the link 10a is farther to the left in Fig. 12 than in Fig. 8 by the distance designated 74.

It will be appreciated that there is nothing critical in the engagement between the cam surface 56 and the tip 68 of the spring 62. No particular degree of pressure is required, and if the spring 62 should weaken in use the linkage-lengthening arrangement will still continue to function properly, provided only that the finger tip 68 would engage with the abutment 58. In this regard it may be noted that instead of utilizing a recessed abutment, a projecting directional abutment 58' could also be employed having one abrupt edge 76 and one smoothly inclined edge 78 (see Fig. 6A), in which case engagement of the spring tip 68 with the side surface of the element portion 56 could be entirely dispensed with, the spring tip 68 only engaging the abutment projecting out from said side surface 56, snapping idly over that abutment in normal operation and engaging the abutment and positively moving the connecting element 32 during operation in the other direction.

Only a minimal number of parts are employed in the practice of the present invention, of these parts only the connecting element 32 is at all irregular in shape, and that connecting element can well be formed of molded plastic such as nylon in order to keep down its cost and still produce a structural element which will stand up over long periods of operation. Assembly of the linkage is extremely simple, the only parts which are at all subject to dislocation or damage are the springs 52 or 62, and those are very readily replaced in the event that that should be necessary.

Although but a single embodiment of the present invention has been here disclosed, along with one detail modification thereof, it will be apparent that many variations may be made therein, all within the spirit of the invention as defined in the following claims.

I claim:

1. A direction-sensitive linkage-lengthening arrangement comprising a crank arm member and a second member pivotally connected thereto via an element rotatable with respect to both said members and having its axis of rotation relative to one of said members displaced with respect to its axis of rotation relative to the other of said members, yieldable means biasing said element to a first position relative to one of said members, and an element moving means operatively connected between the other of said members and said element, said moving means being ineffective against the action of said yieldable means when said crank arm member is rotated in one direction and operatively engageable with said element when said crank arm is rotated in the opposite direction to move said element against the action of said yieldable means to a second position relative to said one of said members, thereby altering the effective length of one of said members relative to the other, said element moving means comprising a cam surface on one of said element and said other of said members and a finger on the other of said element and said other of said members and resiliently urged into engagement with said cam surface, said cam surface having a discontinuity defining more of an abutment in one direction than in the other.

2. A direction-sensitive linkage-lengthening arrangement comprising a crank arm and a member pivotally connected thereto via an element rotatable with respect to said arm and said member and having its axis of rotation relative to said arm displaced with respect to its axis of rotation relative to said member, yieldable means biasing said element to a first position relative to said member, and an element moving means operative between said arm and said element, said moving means being ineffective against the action of said yieldable means when said crank arm is rotated in one direction and operatively engageable with said element when said crank arm is rotated in the opposite direction to move said element against the action of said yieldable means to a second position relative to said member, thereby altering the effective length of said member relative to said crank arm, said element moving means comprising a cam surface on one of said element and said crank arm and a finger on the other of said element and said crank arm and resiliently urged into engagement with said cam surface, said cam surface having a discontinuity defining more of an abutment in one direction than in the other.

3. A direction-sensitive linkage-lengthening arrangement comprising a driving means and a member driven thereby, the latter being operatively connected to the former by a linkage comprising, in operative sequence, a crank arm member driven by said driving member and an element operatively connected to said crank arm member and rotatable relative thereto, said driven member and said element being operatively connected and relatively rotatable, the axis of rotation of said element relative to said crank arm member being displaced from its axis of rotation relative to said driven member, yieldable means biasing said element to a first position relative to one of said members, and an element moving means operatively connected between the other of said members and said element, said moving means being ineffective against the action of said yieldable means when said crank arm member is rotated in one direction and operatively engageable with said element when said crank arm is rotated in the opposite direction to move said element against the action of said yieldable means to a second position relative to said one of said members, thereby altering the effective length of one of said members relative to the other.

4. The arrangement of claim 3, in which said element moving means comprises a cam surface on one of said element and said other of said members and a finger on the other of said element and said other of said members and resiliently urged into engagement with said cam surface, said cam surface having a discontinuity defining more of an abutment in one direction than in the other.

5. A direction-sensitive linkage-lengthening arrangement comprising a driving means and a member driven thereby, the latter being operatively connected to the former by a linkage comprising, in operative sequence, a crank arm driven by said driving member and an element operatively connected to said crank arm and rotatable relative thereto, said driven member and said element being operatively connected and relatively rotatable, the axis of rotation of said element relative to said crank arm being displaced from its axis of rotation relative to said driven member, yieldable means biasing said element to a first position relative to said driven member, and an element moving means operative between said crank arm and said element, said moving means being ineffective against the action of said yieldable means when said crank arm is rotated in one direction and operatively engageable with said element when said crank arm is rotated in the opposite direction to move said element against the action of said yieldable means to a second position relative to said member, thereby altering the effective length of said member relative to said crank arm.

6. The arrangement of claim 5, in which said element moving means comprises a cam surface on one of said element and said crank arm and a finger on the other of said element and said crank arm and resiliently urged into engagement with said cam surface, said cam surface having a discontinuity defining more of an abutment in one direction than the other.

7. A direction-sensitive linkage-lengthening arrangement comprising a crank arm member and a second member pivotally connected thereto via an element rotatable with respect to both said members and having its axis of rotation relative to one of said members displaced with respect to its axis of rotation relative to the other of said members, yieldable means biasing said element to a first position relative to one of said members, and an element moving means operatively connected to the other of said members, movable therewith, and operatively engageable with said element upon rotation of said other of said members in one direction to move said element against the action of said yieldable means to a second position relative to said one of said members, said element moving means being ineffective against the action of said yieldable means when said other of said members is rotated in the opposite direction, thereby causing the effective length of one of said members relative to the other to vary.

8. The arrangement of claim 7, in which said element moving means comprises a cam surface on one of said element and said other of said members and a finger on the other of said element and said other of said members and resiliently urged into engagement with said cam surface, said cam surface having a discontinuity defining more of an abutment in one direction than the other.

9. A direction-sensitive linkage-lengthening arrangement comprising a crank arm and a member pivotally connected thereto via an element rotatable with respect to said arm and said member and having its axis of rotation relative to said arm displaced with respect to its axis of rotation relative to said member, yieldable means biasing said element to a first position relative to said member, and an element moving means operatively connected to said crank arm, movable therewith, and operatively engageable with said element upon rotation of said crank arm in one direction to move said element against the action of said yieldable means to a second position relative to said member, said element moving means being ineffective against the action of said yieldable means when said crank arm is rotated in the opposite direction, thereby causing the effective length of said crank arm relative to said member to vary.

10. The arrangement of claim 9, in which said element moving means comprises a cam surface on one of said element and said crank arm and a finger on the other of said element and said crank arm and resiliently urged into engagement with said cam surface, said cam surface having a discontinuity defining more of an abutment in one direction than the other.

11. The arrangement of claim 1, in which interengaging means are provided between said element and one of said members effective to limit the movement of said element away from its first position relative to said member.

12. The arrangement of claim 3, in which interengaging means are provided between said element and one of said members effective to limit the movement of said element away from its first position relative to said member.

13. The arrangement of claim 2, in which interengaging means are provided between said element and said member effective to limit the movement of said element away from its first position relative to said member.

14. The arrangement of claim 4, in which interengaging means are provided between said element and said member effective to limit the movement of said element away from its first position relative to said member.

15. A direction-sensitive linkage-lengthening arrangement comprising a crank arm, a member, an element rotatably mounted on said member, resilient means active between said element and said member biasing said element to a first position relative to said member, said element extending toward and being rotatably mounted on said crank arm about an axis eccentric with respect to that portion of said element rotatably mounted on said member, a cam surface on said element having a discontinuity defining more of an abutment in one direction than in the other, and an element-actuating finger on said crank arm, resiliently urged into engagement with said cam surface and movable therealong as said crank arm is rotated, rotation of said crank arm in one direction causing said finger to ineffectually snap over said abutment, said element thus remaining in its first resiliently urged position relative to said member, rotation of said crank arm in the other direction causing said finger to engage said abutment and rotate said element about its axis with respect to said crank arm from its first position to a second position relative to said member, thereby changing the effective length of said member with respect to said crank arm.

16. The arrangement of claim 15, in which interengaging means are provided between said element and said connecting member effective to limit the movement of said element away from its first position relative to said member.

17. A direction-sensitive linkage-lengthening arrangement comprising a crank arm, an element having a first portion mounted on said crank arm so as to be rotatable about an axis, a side surface of said element comprising a cam surface having a discontinuity defining more of an abutment in one direction than the other, a finger secured to said crank arm and resiliently urged into engagement with said cam surface, a member positioned above said crank arm and having an aperture, said element having a second portion operatively connected thereto, eccentric with respect to the axis of rotation of said first portion, and rotatably received within the aperture in said member, and a spring operatively connected between said member and said element to bias said element toward a first position relative to said member, rotation of said crank arm in one direction causing said finger to ineffectually snap over said abutment, said element thus remaining in its first resiliently urged position relative to said member, rotation of said crank arm in the other direction causing said finger to engage said abutment and rotate said element about its axis with respect to said crank arm from its first position to a second position relative to said member, thereby changing the effective length of said member with respect to said crank arm.

18. The arrangement of claim 17, in which said spring is connected at one end to said member, the body of said spring extending along a surface of said member, the other end of said spring being secured to an extension of said element overlying said surface of said member.

19. The arrangement of claim 18, in which said element extension has an arcuate cut-out area of limited extent, said member having a finger fixed thereto and extending into said cut-out area, thereby defining means to limit the movement of said element away from its first position relative to said member.

20. The arrangement of claim 17, in which said element extension has an arcuate cut-out area of limited extent, said member having a finger fixed thereto and extending into said cut-out area, thereby defining means to limit the movement of said element away from its first position relative to said member.

References Cited in the file of this patent

UNITED STATES PATENTS

| 2,308,212 | Scott-Iverson et al. | Jan. 12, 1943 |

FOREIGN PATENTS

| 873,802 | Germany | Apr. 16, 1953 |